Sept. 8, 1931.  A. MINET  1,822,817
LUBRICATING SYSTEM FOR VERTICAL SHAFTS
Original Filed March 1, 1926
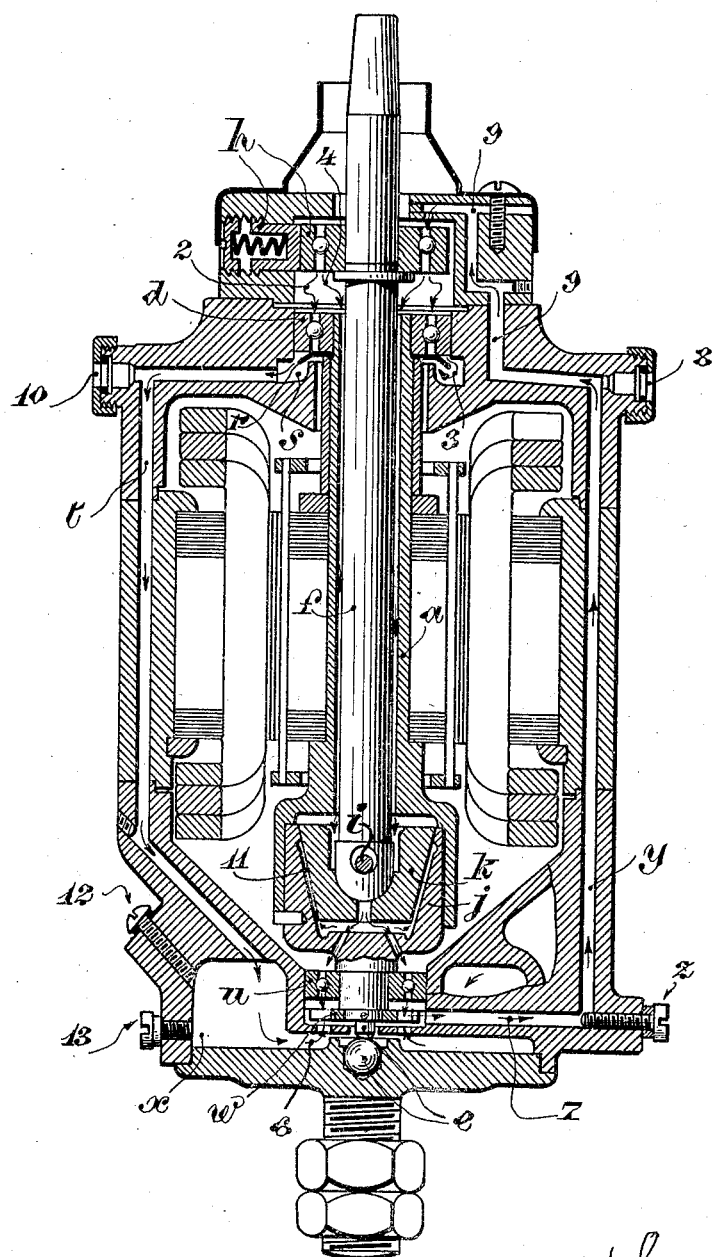
Inventor
Auguste Minet
By B. Singer, atty Patented Sept. 8, 1931

1,822,817

UNITED STATES PATENT OFFICE

AUGUSTE MINET, OF ST.-ETIENNE, FRANCE, ASSIGNOR TO CONSTRUCTION FRANCAISE D'APPAREILS DE LAITERIE, SOCIÉTÉ ANONYME, OF ST.-ETIENNE, FRANCE

LUBRICATING SYSTEM FOR VERTICAL SHAFTS

Original application filed March 1, 1926, Serial No. 91,631, and in France September 2, 1925. Divided and this application filed February 9, 1927. Serial No. 167,025.

I have filed applications for patent in France on September 2, November 10 and November 16, 1925, and January 13, 1926; Germany September 19, 1925 and February 3, 1926; Spain October 14, 1925; Belgium September 29, 1925, and January 28, 1926; Holland November 10, 1925, and February 2, 1926; Italy October 8, 1925; Japan October 28, 1925; Switzerland November 10, 1925, and January 25, 1926; and Czecho-Slovakia January 4, 1926.

The invention relates to improvements in lubricating systems for vertical shafts and more especially for the shafts of centrifugal machines such as are employed in dairies or in the textile or chemical trades, which must rotate at very high speeds.

The invention consists essentially in the novel arrangement and construction of parts, whereby a continuous circulation of lubricant to the various bearings or moving parts is assured, whether the machine is at rest or running and in which the oil is kept entirely away from the motor elements mounted on the vertical shaft. This application is a division of my copending application for Letters Patent on Drives for the cages of centrifugal machines, filed March 1, 1926, Serial Number 91,631.

The invention is illustrated in the accompanying drawing which is a vertical sectional view.

The arrangement comprises a hollow shaft $a$ on which is keyed the rotor $b$ rotating within a stator enclosed within a casing $c$.

The shaft $a$ is accurately centred at its upper end in ball bearing $d$ and at its lower rests in a foot step bearing $e$. The shaft or spindle $f$ carrying the centrifugal cage is arranged inside the hollow shaft $a$ rigidly affixed to a member $j$ having a hollow conical or other shaped interior. The socket carrying the spindle $f$ is formed with a conical exterior $k$, a driving pin $i$ passing there through in order to transmit a rotating movement to the spindle. The spindle $f$ is guided and supported partway along its length by a spring support $h$.

The friction clutch $jk$ is provided to reduce the inevitable shocks at starting when the motor rapidly attains its maximum speed.

By raising the spindle $f$ the contact between the member $k$ and the member $j$ is broken which uncouples the electric motor from the spindle. On starting up, the shocks and unevenness of the drive from the motor are absorbed by slipping taking place between the two members $j$ and $k$.

When the machine is running, the oil, after flowing through the bearing $h$ is forced by centrifugal action through the ball bearings $d$ of the hollow shaft $a$ of the rotor $b$ (as shown by the arrows 2). From here it passes to a flange $r$ from which it drops into a circular duct $s$ (as shown by the arrows 3) from which it passes through the passages $t$ to the lower ball bearings $u$ and to the footstep bearing $e$.

On the other hand when the machine is at rest the oil on passing through the bearing $h$ flows against the spindle $f$ (as shown by the arrows 4) and so into the inside of the hollow shaft $a$ lubricating the ball end $i$ and then proceeding (as shown by the arrows 5) to the ball bearings $u$ and the footstep bearing $e$.

A small turbine $w$ mounted on the lower end of the hollow shaft $a$ below the lower ball bearing $u$ draws oil from a reservoir $x$ (as shown by the arrows 6) situated in the frame of the machine, forces it (as shown by the arrows 7) into the passage $y$ the flow being regulated by a set screw $z$.

At the top of this passage is a sight 8 allowing the flow to be observed at any time. After passing through the passage $y$ the oil passes through a series of ducts 9 suitably arranged with respect to each other and then finally emerges at the upper side of the spring guide bearing $h$ through which it passes. It now divides into two streams. One portion following the arrows 2 flows through the ball bearing $d$ into a circular duct $s$ as shown by the arrows 3 and then through the passages $t$ to the reservoir $x$. In this passage $t$ a sight 10 is also provided so that the flow of oil can be observed. The other portion on emerging from the bearing $h$ flows along the spindle $f$ as shown by the arrows 4 lubricating the socket $k$, the bearing $u$ the footstep bearing $e$ and falls on to the turbine $w$ by which it is recirculated.

In order to ensure a permanent lubrication on the clutch to give a smoother starting the outside of the socket $k$ is formed with oil grooves 11.

Plugs 12 and 13 are employed for sealing the inlet and outlet ducts to the reservoir.

An efficient lubrication system is thus obtained and one in which the oil is kept entirely separate from the motor windings.

What I claim and desire to secure by Letters-Patent is:—

1. Apparatus of the class described, comprising a casing, a revoluble element in the casing and including a vertical tubular shaft having upper and lower bearings, a vertical spindle having its lower portion arranged in said tubular shaft and provided at its lower end with a bearing in said tubular shaft, a bearing in the upper portion of said casing for the upper portion of said spindle, means including a duct to supply lubricating oil to the upper bearing of said spindle, said bearing being arranged to cause oil to descend therefrom into said tubular shaft to lubricate the lower bearing of said spindle when the machine is at rest and to centrifugally throw the lubricant to the upper bearing of the tubular shaft when it is in operation, said casing having a duct leading from below the last named bearing to the lower bearing of said tubular shaft to conduct lubricant to said lower bearing and being further provided with a return duct which leads from the lower bearing of the tubular shaft and which conveys lubricant therefrom to the upper bearing of the spindle, the said tubular shaft being provided near its lower end with means to cause the lubricant to circulate through the lubricating duct and also through the return duct.

2. Apparatus as claimed in claim 1, in which the duct which leads from the lower bearing of the tubular shaft is a return duct which conveys lubricant to the upper bearing of the spindle and the said tubular shaft is provided near its lower end with means to cause the lubricant to circulate through the lubricating duct and also through the return duct.

In witness whereof I affix my signature.

AUGUSTE MINET.